US005134017A

United States Patent [19]

Baldwin et al.

[11] Patent Number: 5,134,017

[45] Date of Patent: Jul. 28, 1992

[54] FOAM COATED PROTECTIVE APPAREL FABRIC

[75] Inventors: Alfred F. Baldwin; Ladson L. Fraser; Charles G. Barnes, all of Greensboro, N.C.

[73] Assignee: Precision Fabrics Group, Inc., Greensboro, N.C.

[21] Appl. No.: 635,375

[22] Filed: Jan. 2, 1991

Related U.S. Application Data

[63] Continuation of Ser. No. 550,042, Jul. 9, 1990, abandoned, which is a continuation of Ser. No. 239,747, Sep. 2, 1988, abandoned.

[51] Int. Cl.[5] .................... A41D 13/00; A41D 31/02; B32B 5/20; B32B 5/28

[52] U.S. Cl. .................... 428/198; 2/1; 2/243 A; 2/DIG. 1; 428/219; 428/288; 428/290; 428/296; 428/308.4; 428/315.5; 428/315.7; 428/317.9

[58] Field of Search .................... 2/1, 243 A; 428/198, 428/219, 288, 290, 296, 308.4, 315.5, 315.7, 315.9

[56] References Cited

U.S. PATENT DOCUMENTS

| | | | |
|---|---|---|---|
| 3,567,565 | 3/1971 | Jones et al. | 428/102 |
| 4,499,139 | 2/1985 | Schortmann | 428/315.5 |
| 4,554,198 | 11/1985 | Blucher et al. | 428/315.5 |
| 4,761,326 | 8/1988 | Barnes et al. | 428/315.5 |
| 4,863,788 | 9/1989 | Bellairs et al. | 428/317.5 |
| 4,886,702 | 12/1989 | Spek et al. | 428/308.4 |
| 4,910,078 | 3/1990 | Hill et al. | 428/315.5 |
| 4,943,475 | 7/1990 | Baker et al. | 428/315.9 |
| 4,961,985 | 10/1990 | Henn et al. | 428/284 |
| 5,035,943 | 7/1991 | Kinlaw et al. | 428/311.5 |

*Primary Examiner*—James C. Cannon
*Attorney, Agent, or Firm*—Finnegan, Henderson, Farabow, Garrett & Dunner

[57] ABSTRACT

Foam-coated spunbonded or spunbonded/pointbonded nonwovens provide effective filtration of dirt and dust particles yet are comfortable and breathable with water resistance properties. Protective clothing constructed of this fabric for workers exposed to dust, dirt and other particulate matter.

11 Claims, No Drawings

FOAM COATED PROTECTIVE APPAREL FABRIC

This application is a continuation of application Ser. No. 07/550,042, filed Jul. 9, 1990, and abandoned, which is a continuation of application Ser. No. 07/239,747, filed Sep. 2, 1988, now abandoned.

This invention relates to an inexpensive foam-coated non-woven fabric useful as a barrier fabric for protective clothing worn by workers exposed to dust and dirt.

BACKGROUND OF THE INVENTION

There is a need for an inexpensive functional barrier fabric to produce protective apparel, coveralls, coats, and the like which offer the wearer a measure of protection from dirty or dusty environments. Protective apparel of this type is designed to be disposable after use and is not laundered. The fabric should be comfortable to the wearer and provide this protection at a minimum cost. One deficiency of many of the low cost protective apparel fabrics currently available, such as flash spun polyethylene (Tyvek, DuPont), is the lack of breathability and comfort. These fabrics are typically worn in uncontrolled, hot environments and problems with worker discomfort and overheating are common. The foam-coated barrier fabrics provided by this invention provide a degree of breathability, protection and comfort not available in competitively priced fabrics.

Other less comfortable fabrics are often times modified with perforations or vents which prove costly and compromise barrier properties.

While not offering protection from extremely hazardous or toxic materials, these fabrics are useful in areas where a moderate level of skin and body protection is acceptable. Spray painting, trash removal, construction, baghouse inspection, sandblasting, and general maintenance/dirty job use—re all areas where a comfortable protective garment is desired.

Foam-coated and foam-backed textile materials are described in the patent literature, primarily relating to domestic textiles and upholstery fabric. As examples, see U.S. Pat. No. 3,625,970, describing a glass fabric having a foam polymer backing for a drapery, U.S. Pat. No. 3,748,217 in which a foam organic polymer bonds a textile fabric to a spunlaced nonwoven fabric, again for drapery face fabrics; also U.S. Pat. Nos. 3,862,921, and 4,362,774 relating to foam-backed drapery fabrics. Various techniques of applying foam to textile substrates are also described in the patent literature, as evidenced by U.S. Pat. Nos. 3,862,291; 4,362,774; and 4,387,118. Other foam polymer applications and procedures are described in U.S. Pat. Nos. 3,527,565 and 3,642,563.

U.S. Pat. No. 4,499,139 describes forming a strata or layer within the single ply fibrous web, as depicted in FIGS. 1 and 2 of this patent in which the froth is worked into the fabric to form interconnecting links to hold the surface fibers in place. The face of the fabric is scraped free of froth so that the outermost fibers on both the top and bottom surfaces are substantially froth-free. The fabric of the present invention has an entirely different structure with a quantity of foam on at least one surface of the fabric as well as the foam penetrating most, if not all, of the nonwoven fabric web.

DETAILED DESCRIPTION OF THE INVENTION

We have found and hereby disclose that by coating a lightweight spunbonded fabric with an open-celled, hydrophobic, antistatic, polymeric foam, a suitable barrier fabric meeting these objectives at a reasonable cost is produced.

This invention provides a barrier-type fabric for the protective apparel market at a competitive cost and with comfort advantages. Using the appropriate open-celled foam with suitable property-enhancing ingredients and coating procedures, the nonwoven coated fabric offers a favorable balance of protection as compared with product cost. Foam coating provides a uniform, consistent product, required for an apparel fabric, that may be produced in high volume to further lower the expense of production. The fabric's performance may be adjusted to accommodate various requirements and properties by changing the nature of the foam and/or the manner and density to which it is applied. Preferably, the fabric provides ample barrier properties to particulates (dirt, dust, short fibers, lint) and fluids, together with antistatic properties. Product opacity and uniform appearance make the fabric suitable for use in apparel.

The product consists of a nonwoven substrate, such as a lightweight spunbonded fabric, coated with an open celled polymeric foam preferably including additives to render the coated fabric hydrophobic and antistatic. The substrate is a lightweight spunbonded nonwoven or a spunbonded and pointbonded synthetic fabric made of polyester, nylon or, preferably an olefin such as polypropylene may be used. Specific examples include:

| | |
|---|---|
| Spunbonded polypropylene | Typar |
| Spunbonded polyester | Reemay, Asahi, Lutradur |
| Spunbonded/pointbonded polypropylene | Celestra, Polybond, Evolution |
| Sunbonded nylon | Cerex |
| Spunbonded nylon/pointbonded | PBN II |

Other nonwoven substrates could be used depending upon their properties and costs. The preferred substrate is spunbonded polypropylene; the most preferred substrate is spunbonded/pointbonded polypropylene. Basis weight of the uncoated substrate is in the range of 0.75 to about 2.0 oz/sq. yd. Fiber denier falls in the range of from 1.0 to 5.0.

The polymeric foam is prepared from an aqueous polymeric solution containing a surfactant (for foaming), fillers and opacifying agents, dyes, curing agents to cure the polymer and property modifiers such as water repellents, antistats, detacifiers, surface lubricants, fungicides or antibacterial agents. A suitable, open-celled, hydrophobic polymeric foam is created by the mechanical induction of air into a suitable aqueous coating compound or formulation. A typical composition for a material of this type is as follows:

TABLE 1

| ingredients | dry parts | wet parts |
|---|---|---|
| aqueous emulsion polymer dispersion (40-50% active) | 100 | 200 |
| filler | 60-160 | — |
| thickener | 0.25-1.5 | 0.25-4.5 |
| ammonium stearate | 3-10 | 8-30 |
| melamine resin | 2.5-10 | 2.5-10 |
| catalyst | 0.25-0.7 | 1-28 |
| property modifiers* | as needed | as needed |

*see below

The aqueous polymer dispersion may be acrylic, vinylacetate, vinyl chloride, vinyl alcohol, urethane, styrene butadiene, acrylonitrile, ethylene vinyl acetate, and ethylene vinyl chloride, vinylidene chloride, and is preferably an acrylic latex such as TR77, HA8, HA16, TR934, TR407 (Rohm and Haas) or 21638 (Hycar), HYCAR 561X87 or HYCAR 26804 (B.F. Goodrich). The fillers include inorganic mineral fillers such as clay, talc, and silica and opacifiers such as titanium dioxide. These solid, substantially insoluble particles are dispersed in the aqueous solution with the use of a dispersing aid or surfactant. Alternate mineral fillers include kaolin clay, talc, feldspar, mica, silica, pyrophyllite, hydrated alumina and calcium carbonate. An appropriate pigment may be included, as desired.

Titanium dioxide is optional; when present it serves as an opacifier and imparts a more attractive look to a semi-transparent substrate. An appropriate colored pigment may be included, as desired. Filler loading is from 0% up to 150% of polymer solids.

The foam coating is prepared first by mixing the solid fillers and colors to form a dispersion. Solids range from 30% to 65% of the dispersion. Suitable fillers are inorganic mineral fillers such as clays, talcs and carbonates, all as listed above. An opacifier or white pigment such as titanium dioxide may be included, if desired, to lend the correct degree of opacity, or it may be omitted entirely, as explained above. These solid, substantially insoluble particles are dispersed in water with the use of a dispersing aid or surfactant.

The coating composition is based upon a resin or combination of resins plus filler(s) and indeed the filler(s) may represent more than half of the total weight of the two components. Other necessary ingredients include a foaming aid or surfactant to assist in forming a stable foam plus any other reactants or auxiliaries required to cross-link the resin and form a foam that, upon drying, remains stable and continues to exhibit the desired performance characteristics over the life of the article.

While not wishing to be limited exclusively to this group of polymers, a typical polymer selection may be an acrylic, styrene-butadiene rubber (SBR), vinyl acetate, polyvinyl alcohol urethane, vinyl chloride, or vinylidene chloride or achylonitrile polymer, preferably in the form of a dispersion. Total solids of the coating composition range from 40 to 70% by weight. The pH of the composition may be adjusted by the addition of a suitable base, such as ammonia, to maintain a pH in the range of 7 to 10, preferably in the range of pH 8 to 9. The coating composition, prior to foaming, should have a viscosity of from about 400 to 2,000 cps with a viscosity of about 600 to 900 cps preferred. A thickener may be included to achieve the best viscosity. The coating composition is usually maintained and applied at a temperature in the range of from 70° F. to 110° F.

The melamine resin, such as Aerotex 3030, Aerotex M-3 or Permafresh MEL, secures the polymer plus filler to the synthetic fibers of the nonwoven substrate. A suitable catalyst, such a diammonium phosphate, magnesium chloride, ammonium chloride or ammonium sulfate, is included to cure the malamine resin. Catalyst concentration is in the range of 0.2 to 5.0% of the formulation. Diammonium phosphate provides an exceptionally hard cure which improves the fabric's water repellency to retain fabric filtration efficiency even when wet. Unexpectedly, diammonium phosphate improves the fabric's antistatic properties, thus is a preferred catalyst.

The optional fluorocarbon repellent component is typically a dispersion of fluoropolymer in water. See generally Fluorine-Containing Polymers, Encyclopedia of Polymer Science & Technology, pp. 179–203, Interscience, 1967, the disclosure of which is hereby incorporated by reference. The fluoropolymer component may be selected from a host of commercially available products including DuPont's Zonyl NWG, Zonyl NWF, Zepel RS, Zepel RN and 3-M's FC-831, FC-834 and FC-461. One will select a repellent fluorocarbon component that is compatible with the system, i.e., the other bath components and processing conditions, is economical and provides the required water repellency. As the fluorocarbon component is expensive, described below, it is desirable to use the smallest amount of this.

Detacifiers, when used, reduce the tendency of the fabric to stick to itself. Surface lubricants give the finished fabric a hand similar to a woven fabric. Ampitol PE30 of Dexter Chemical is a suitable lubricant. Fungicides and antibacterial agents such as Dow Corning DC 5700 may be included. The property modifiers are included in the formulation to impart the specific characteristic(s) desired while monitoring the cost of the overall product.

The coating composition is mechanically foamed in a foam generator such as an Oakes foamer or a L.E.S.S. model 500 super foamer to achieve a ratio of from four to twenty parts air to one part coating composition, with a ratio of 4:1–7:1 being preferred.

The compound is then applied by any convenient means, such as a knife coater (knife over roll, knife over gap, knife over table, knife over blanket, floating knife or air knife) or a gapped pad, or by dipping the substrate through the aerated compound. The coater is adjusted to apply the coating to the fabric in a fashion so as to both impregnate and surface coat the material. A knife coater is preferred to apply the foam. The fabric is then run through the coater at a speed of from 50 to 80 yards per minute. The combination of pressure and scraping action forces the coating into the fabric while leaving a thin surface coat. This serves to fill or partially fill the void space between the fibers and provide the degree of filtration desired.

Based upon the above formulation, a coating weight of between 0.25–2.0 oz/sq. yd. of solids should be applied.

The fabric is then dried at 150°–300° F. in a conventional hot air tenter frame or infrared, belt or drum dryer at a speed which allows for at least eighteen seconds of drying time. Curing temperatures range from 260° to 350° F., the upper limit dependent upon the type of fiber in the substrate. The coating may be crushed between a set of rollers which are typically rubber over steel, steel over steel, or steel over rubber. Following the optional step of crushing, the fabric may be post cured for an additional thirty seconds to two minutes at 285° F. During the post cure, an additional finish may be applied to enhance the fabric properties, improve repellency, add softness and reduce blocking. The post cure may be omitted if all properties are achieved in the coating pass. The finished fabric is then trimmed and packaged.

TABLE 2

| Property | Test Method | Values |
|---|---|---|
| Basis wt. | ASTM D1117 §17 | 1.2–2.5 oz/sq. yd. |

TABLE 2-continued

| Property | Test Method | Values |
|---|---|---|
| Tensile Strength | STM D1117 §7 | 20# MD Min.<br>10# XD Min. |
| Mullen burst | ASTM D1117 §8 | 18 psi min. |
| Elmendorf tear | INDA IST 100.0 | 700 g. minimum |
| Spray Rating | A.A.T.C.C. 22 | 50 min. |
| Static decay | N.F.P.A. 99 | 0.5 sec avg. max. |
| Flammability | CS-191-53 | greater than 3.5 sec. |

To quantitatively describe the ability of a fabric or other material to exclude dusts, a laboratory method using talc or known particle size is sometimes used. This is useful to show comparisons between fabrics as well as indicated the particle size range where the material is most effective.

Talc filtration is measured on a 3×3 inch sample for initial aerosol efficiency test IBR TM E-308 using an HIAC 236 laser counter with talc as the contaminant at a flow rate of 0.945 SCFM (equivalent face velocity of 15 ft/min). The results obtained for a typical sample of a barrier fabric according to this invention are as follows:

TABLE 3

| Particle Size (microns) | Efficiency (percent) |
|---|---|
| 0.12 | 30 to 95 |
| 0.17 | 30 to 95 |
| 0.27 | 35 to 95 |
| 0.42 | 35 to 95 |
| 0.62 | 45 to 95 |
| 0.87 | 50 to 95 |
| 1.17 | 50 to 95 |
| 1.52 | 55 to 95 |
| 1.92 | 60 to 95 |
| 2.37 | 60 to 95 |
| 287 | 60 to 95 |
| 3.42 | 65 to 98 |
| 4.02 | 65 to 98 |
| 4.67 | 70 to 99 |
| 5.37 | 70 to 99 |

The invention is further described with reference in the following example in which all parts and percentages are expressed on the basis of weight and temperatures reported in °F. unless indicated otherwise.

EXAMPLE

A 1.25 oz/sq. yd. spunbonded/pointbonded polypropylene fabric (Celestra II by James River Nonwovens Co.) is knife over foam coated with the following foamed composition:

TABLE 4

| ingredient | wet parts | dry parts |
|---|---|---|
| acrylic latex | 470 | 277.3 |
| diammonium phosphate solution | 40 | 13.3 |
| blue dye (Sandoz Graphtol Blue 6825) | 0.02 | 0.008 |
| | 510.02 | 290.608 |

The acrylic latex used was Hipofoam TW-1, a compounded, aqueous acrylic latex from High Point Chemical Corp., High Point, N.C., which includes fillers, thickeners and foaming agents.

The above formulation was aerated in a L.E.S.S. Model Digifoam D-501 foamer at a ratio of 7 parts of air to 1 part of formulation. The foam was applied to the substrate by knife coating over a foam rubber pad to a solids coating weight of from 0.35 to 0.75 oz/sq. yd. The coated fabric was dried and cured in a forced air tenter frame at a temperature of 275° F. for 40 seconds. The coated fabric was then passed through steel over urethane rubber nip roll to crush the coating structure. The coated fabric was slit to the desired width and packaged.

The fabric produced displayed the following properties:

TABLE 5

| PROPERTY | TEST METHOD | VALUES |
|---|---|---|
| Basis Weight | ASTM D1117 §17 | 1.6-2.0 oz/sq. yd. |
| Tensile Strength | ASTM D1117 §7 | 28-36#<br>16-18# |
| Mullen Burst | ASTM D1117 §8 | 22-28# |
| Elmendorf Tear | INDA IST 100.0 | MD 800-1168 gram<br>XD 1072-1440 gram |
| Spray Rating | AATCC 22 | 50-60 |
| Static Decay | NFPA 99 | .25 to .5 seconds |
| Flammability | CS191-53 | Class 1 |
| Talc Filtration | | |

TABLE 6

| Talc Filtration Efficiency | |
|---|---|
| Particle Size (microns) | Efficiency (%) |
| 0.12 | 50-90 |
| 0.17 | 60-90 |
| 0.27 | 70-95 |
| 0.42 | 70-97 |
| 0.62 | 70-98 |
| 0.87 | 70-99 |
| 1.17 | 70-99 |
| 1.52 | 70-99 |
| 1.92 | 70-99 |
| 2.37 | 70-99 |
| 2.87 | 70-99 |
| 3.42 | 70-99 |
| 4.02 | 70-99 |
| 4.67 | 70-99 |
| 5.37 | 70-99 |

What is claimed is:

1. An air permeable, foam coated barrier fabric suitable for use as a barrier fabric for protective clothing, the fabric being composed of a nonwoven textile substrate having a continuous network of an open-celled microporous, hydrophobic, polymeric foam distributed among the fibers of said fabric and covering substantially the entire top surface of the textile substrate and extending into at least the top 60% of the textile fabric, said foam defining a barrier to dust and particulates yet allowing air and water vapor to pass into and out of the fabric, the fabric having a spray rating according to AATCC 22 of at least 50, a talc filtration efficiency IBR TM E-308 in accordance with Table 3, and a static decay NFPA-99 of 0.5 second average maximum.

2. The barrier fabric of claim 1, in which the foam contains a polymeric binder selected from the group consisting of acrylic, acrylonitrile, sytrenebutadine rubber, vinyl acetate, urethane, vinyl chloride and vinylidene chloride polymers, together with at least one filler or opacifying agent.

3. The barrier fabric of claim 2, in which the polymeric binder is an acrylic resin and the foam contains titanium dioxide as an opacifier.

4. The barrier fabric of claim 1, in which the substrate is a spunbonded/pointbonded polyolefin nonwoven.

5. The barrier fabric of claim 4, in which the substrate is a polypropylene nonwoven.

6. The barrier fabric of claim 1, in which the fabric has an overall basis weight in the range of about 1.2 to about 2.5 ounces per square yard.

7. The barrier fabric of claim 1, in which the fabric has a CS-191-53 flammability greater than 3.5 seconds.

8. A protective garment constructed of the barrier fabric of claim 1.

9. The barrier fabric of claim 1 in which said nonwoven textile substrate is spunbonded or spunbonded and pointbonded.

10. The barrier fabric of claim 1 in the fabric has a static decay of less than 0.5 seconds average maximum.

11. The barrier fabric of claim 1 in which said continuous network of an open-celled microporous, hydrophobic, polymeric foam is cured using diammonium phosphate as a catalyst.

* * * * *